United States Patent [19]

Brinkley et al.

[11] Patent Number: 4,805,684
[45] Date of Patent: Feb. 21, 1989

[54] TIRE TREAD GROOVING METHOD AND APPARATUS

[75] Inventors: Max D. Brinkley, North Canton; Norman B. Harding, Akron, both of Ohio; Richard J. Licence, Fort Pierce, Fla.

[73] Assignee: The Goodyear Tire & Rubber Company, Akron, Ohio

[21] Appl. No.: 887,056

[22] Filed: Jul. 18, 1986

[51] Int. Cl.[4] ............................................. B29H 21/08
[52] U.S. Cl. .................................................... 157/13
[58] Field of Search ................................ 157/1.0, 13; 51/DIG. 33, 165.8

[56] References Cited

U.S. PATENT DOCUMENTS

| 2,972,376 | 2/1961 | Garmon | 157/13 |
|---|---|---|---|
| 3,018,822 | 1/1962 | Noall, Jr. | |
| 3,044,536 | 7/1962 | Brown | 157/13 |
| 3,075,575 | 1/1963 | Orenduff | 157/13 |
| 3,502,131 | 3/1970 | Rawls | 157/13 |
| 3,589,427 | 6/1971 | Love | 157/13 |
| 3,623,531 | 11/1971 | Christie | 157/13 |
| 3,885,353 | 5/1975 | Ota et al. | 51/165.8 |
| 3,999,589 | 12/1976 | Meacheam | 157/13 |
| 4,041,647 | 8/1977 | Ugo | 51/DIG. 33 X |
| 4,080,230 | 3/1978 | Batchelor et al. | 156/96 |
| 4,081,017 | 3/1978 | Appleby et al. | 157/13 |
| 4,144,923 | 3/1979 | Curry | 157/13 |
| 4,147,196 | 4/1979 | Jarry | 157/13 |
| 4,206,798 | 6/1980 | Ray et al. | 157/13 |

FOREIGN PATENT DOCUMENTS 0054389  6/1982  European Pat. Off. .

Primary Examiner—Debra Meislin
Attorney, Agent, or Firm—T. P. Lewandowski

[57] ABSTRACT

Tire grooving knives (122) are moved on a frame (28) into a grooving position adjacent the curved tire tread surface (130) of an inflated tire (12) of a predetermined diameter mounted for rotation on a supporting stand (14). The knives (122) are then individually moved by separate actuating assemblies (60) into engagement with the tire tread surface (130) so that as the (12) tire is rotated circumferential (128,156,160) grooves will be cut. The (122) knives and actuating assemblies (60) are adjustable to cut grooves (128,156,160) having sides (158) perpendicular to the tread surface (130) and to cut grooves (128,156,160) in different diameter tires. The knives (122,122′,122″) may also be positioned on the frame (28) at circumferentially spaced locations (172,174,176) around the tire tread surface (130) to provide space for the actuating assemblies (60) to cut closely spaced grooves (128,156,160).

3 Claims, 4 Drawing Sheets

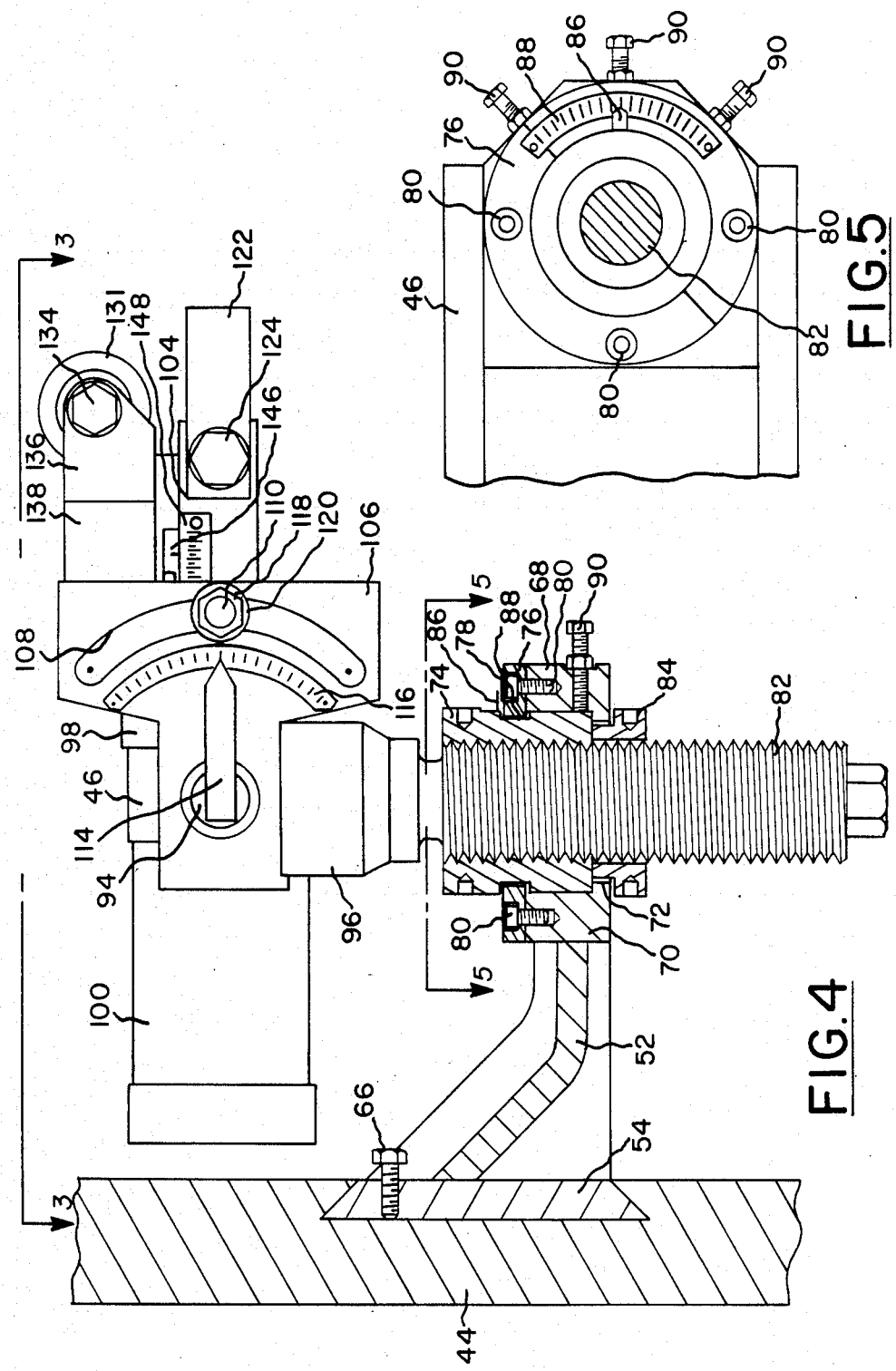

TIRE TREAD GROOVING METHOD AND APPARATUS

This invention relates generally to the grooving of a tire tread surface on an inflated tire mounted for rotation on a supporting stand. This is desirable for radial aircraft tires having circumferential grooves in the treads. These tires are difficult to remove from two-piece molds because of their stiff belt construction. Segmented molds can be used to mold the tires; however, these are expensive especially for limited production tires.

Heretofore grooving apparatus has been provided; however the grooves could not be cut with sides perpendicular to the tread surface which is required for aircraft tires. Problems have also been had in cutting closely spaced grooves because of the interference between the knife assemblies. Other problems have been in adjusting the cutting knives for different diameter tires.

The present invention is directed to a tread grooving method and apparatus in which closely spaced grooves may be cut with sides perpendicular to a curved tread surface. The apparatus is adjustable for cutting grooves in tires of different diameters.

In accordance with one aspect of the invention there is provided apparatus for grooving a tread in a tread surface of a tire mounted on a chuck member rotatably mounted on a tire supporting stand for rotation about an axis coaxial with the axis of the tire comprising a base member, a frame mounted for movement on the base member between a retracted position and a predetermined grooving position for a tire of a predetermined diameter, knife means mounted on the frame, the knife means being adjustable relative to the frame for positioning a knife to cut a groove having sides at a predetermined angle to the tread surface of the tire in the grooving position of the frame, and the knife means including a knife actuating means for moving the knife relative to the chuck member into and out of cutting engagement with the tread surface for cutting the groove to a predetermined length on the tread surface and the knife means being operable independently of the frame for movement of the knife toward the tread surface at the predetermined angle after movement of the frame from the retracted position to the grooving position.

In accordance with another aspect of the invention there is provided a method for forming a groove in a tread surface of a tire mounted for rotation about its own axis on a chuck supported on a tire supporting stand including the steps of:

(a) adjusting the position of a knife means on a frame in a retracted position for engagement of a knife with the tread surface to cut a groove with sides at a predetermined angle to the tread surface;

(b) moving the frame from the retracted position to a tread grooving position adjacent the tread surface;

(c) rotating the tire in the inflated condition;

(d) extending the knife means to move the knife radially of the tire axis into cutting engagement with the tread surface with the frame in the grooving position for grooving the tire;

(e) retracting the knife means to move the knife out of cutting engagement with the tread after rotation of the tire a predetermined amount; and (f) moving the frame from the tread grooving position to the retracted position.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 4 is a side view, partly in section, of one of the rotatable knife mounting assemblies showing the adjustment for different diameter tires.

FIG. 5 is a sectional view taken along the line 5—5 in FIG. 4 showing the adjustment for curvature of the tread surface.

Figure 1:
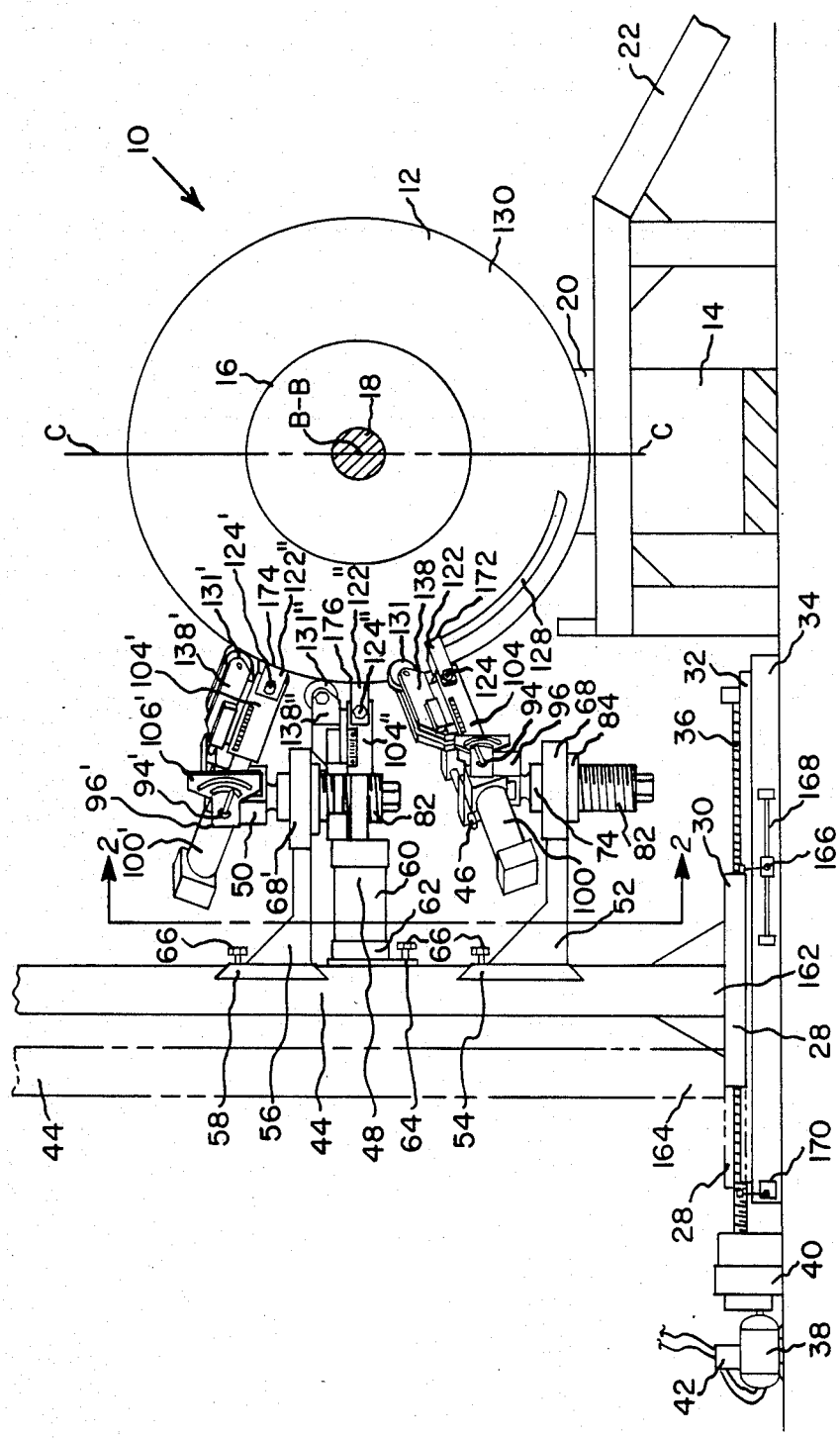
FIG. 1 is a side elevation partly in section of the grooving apparatus embodying the invention with parts being broken away showing a tire mounted on the apparatus and in the process of being grooved.
Figure 2:
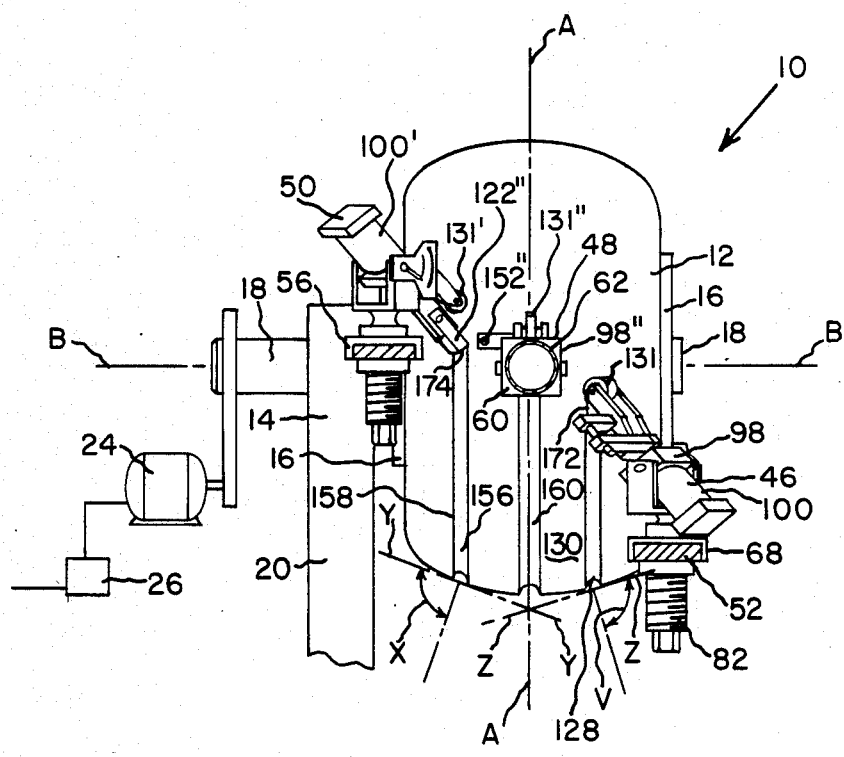
FIG. 2 is a fragmentary sectional view taken along the line 2—2 in FIG. 1.

Referring to FIGS. 1 and 2, a tire tread grooving apparatus 10 is shown in which a tire 12 is mounted on a tire supporting stand 14. Chuck members 16 of the stand 14 are mounted on a shaft 18 supported by stanchions 20 at each side of the tire 12. A ramp 22 is provided for rolling the tire 12 into position between the stanchions 20 at which time the chuck members 16 may be actuated to grip the beads of the tire in a manner well known to those skilled in the art. Provisions may also be made for inflating the tire 12 and lifting it out of contact with the surface of the ramp 22. Power means such as a motor 24 may be provided to rotate the shaft 18 and tire 12. Control means such as switch 26 is connected to the motor 24 for starting and stopping the rotation of the shaft 18 and the chuck members 16.

As shown in FIG. 1, a frame 28 has a slide member 30 slidably mounted on a track 32 of a base 34 on which the frame is mounted for movement toward and away from the tire 12. Movement of the slide member 30 may be provided by rotation of a screw 36 in threaded engagement with a nut member (not shown) in the slide member 30. The screw 36 may be rotated by power means such as a motor 38 and a speed reducer 40. Control means such as switch 42 may be connected to the motor 38 for controlling the rotation of the screw 36 in either direction and stopping the screw at desired positions of the slide member 30 on the base 34.

A vertical support member such as plate 44 is mounted on the slide member 30 for supporting knife assemblies 46, 48 and 50. Knife assembly 46 is mounted on a bracket 52 connected to the plate 44 by a dovetail slide 54 extending horizontally for movement of the knife assembly toward or away from a centerplane A—A of the tire 12. The knife assembly 50 also is mounted on a bracket 56 connected to the plate 44 by a dovetail slide 58 extending horizontally of the plate for movement of the knife assembly toward and away from the centerplane A—A of the tire 12. The knife assembly 48 is located at the centerplane A—A and has a knife actuating means such as piston and cylinder assembly 60 with a cylinder 62 connected to the plate 44 by a dovetail slide 64 extending vertically of the plate 44 for vertical movement of the knife assembly. As shown in FIG.

1, preferably the knife assembly 60 is moved to the same height as an axis B—B of the tire 12 which is coaxial with the axis of the chuck member 16 and shaft 18. Set screws 66 are threaded in the male dovetails for engagement with the surface of the female dovetails of slides 54, 58 and 64 to hold the brackets 52, 56 and cylinder 62 in position. The bracket 52 is adjusted to position the knife assembly 46 at one side of the centerplane A—A of the tire 12 as shown in FIG. 2. The bracket 56 is adjusted to position the supporting knife assembly 50 at the other side of the centerplane A—A of the tire 12 as shown in FIG. 2.

The following description of the knife assembly 46 mounted on the bracket 52 also applied to the knife assembly 50 mounted on the bracket 56 and similar parts will be identified with the same numerals but with a prime mark added for the parts in knife assembly 50. Referring to FIGS. 1 and 4, the bracket 46 of steel supports a socket 68 having a cylindrical side 70 with a base flange 72 for receiving a nut 74 of bronze or similar material for rotation in the socket. A split retainer 76 for engaging a groove 78 in the nut 74 may be fastened to the side 70 of the socket 68 by screws 80 or other fastening means. A rod 82 is threaded in the nut 74 and connected to the knife assembly 46. Rotation of the nut 74 on the rod 82 will raise or lower the knife assembly 46 to a desired level relative to the axis B—B of the tire 12. When the desired height is reached, a locknut 84 threaded on the rod 82 may be rotated into engagement with the nut 74 to set the rod at the desired level.

The position of the knife assembly 46 relative to the curvature of the tire tread in a radial plane may be adjusted by rotating the nut 74 in the socket 68 to a desired angular position as indicated by a point indicator 86 fastened to the nut 74 on a scale 88 on the retainer 76. After angular position of the knife assembly 46 is set, the nut 74 and the rod 82 may be fixed in the set position by set screws 90 threaded in the side 70 of the socket 68 as shown in FIGS. 4 and 5.

Referring to FIGS. 1, 2, 3 and 4, the knife assembly 46 is pivotally mounted for rotation about a horizontal axis on trunions such as pivot pins 92 and 94 supported in bushings in the arms of a yoke 96 mounted on the top of the rod 82. The pivot pins 92 and 94 may be mounted on a cylinder support 98 for cylinder 100 of the knife actuating means which includes the cylinder and a piston having a piston rod 102 connected to a knife holder 104.

As shown in FIG. 4, an adjustment plate 106 is fastened to the yoke 96 and has a slot 108 for sliding engagement with a stud 110 mounted on an arm of the cylinder support 98. A pointed indicator 114 is mounted on the pivot pin 94 and registers with a scale 116 for indicating the angle at which the knife assembly 46 is positioned relative to the axis B—B of the tire 12. Preferably the angle is set so that the knife assembly 46 moves radially of the tire 12. When the knife assembly 46 is set at the desired angle as indicated by the position of the indicator 114 on the scale 116, this position may be fixed by tightening a nut 118 on the stud 110 against a washer 120 in engagement with the adjustment plate 106.

Figure 3:
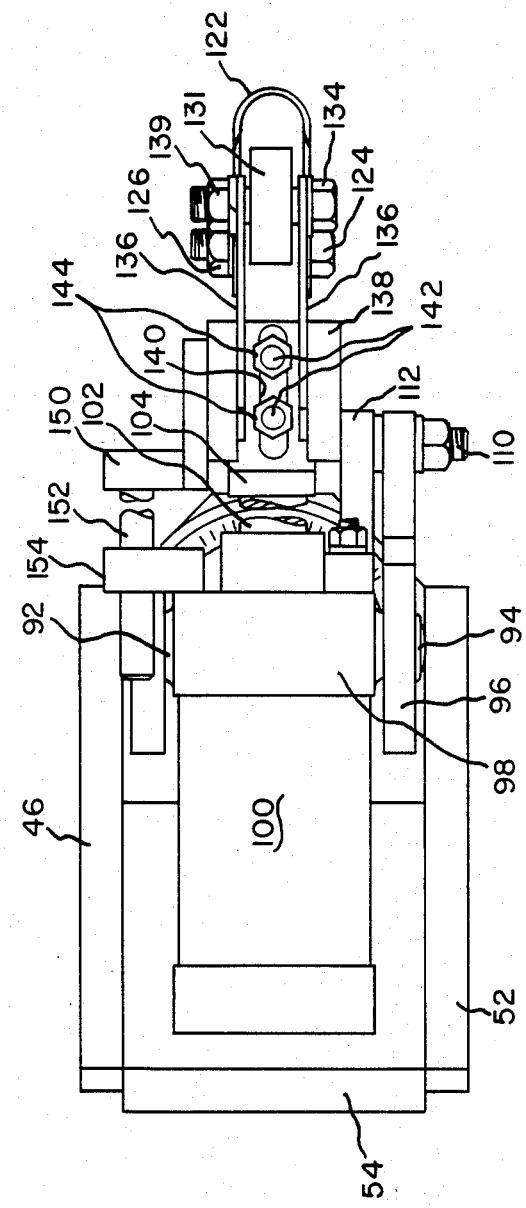
FIG. 3 is a plan view of one of the knife mounting assemblies showing the adjustment for depth of cut.

As shown in FIGS. 3 and 4, the knife holder 104 has a curved, U-shaped knife blade 122 bolted on the end of the knife holder by a bolt 124 extending through the end of the knife holder. A nut 126 is threaded on the bolt 124 for clamping the blade 122 to the knife holder 104. Preferably the knife blade 122 is of the type which can be heated when necessary to facilitate the cutting of the tread. The depth of a groove 128 in a tread surface 130 cut by the knife blade 122 is controlled by a roller 131 rotatably mounted on a bolt 134 extending between brackets 136 carried by a roller support member 138. A nut 139 is threaded on the bolt 134. The roller support member 138 is slidably mounted on the knife holder 104 and has a slot 140 through which studs 142 on the knife holder extend. Nuts 144 may be threaded on the studs 142 to clamp the roller support member 138 in the desired position indicated by the position of an indicator 146 mounted on the roller support member 138 relative to a scale 148 mounted on the knife holder 104.

Rotation of the knife holder 104 relative to the cylinder support 98 is controlled by an arm 150 on the roller support member 138. An antirotation pin 152 on the arm 150 is slidably mounted in a hole in an arm 154 mounted on the cylinder support 98 so that the movement of the knife holder 104 toward and away from the tire 12 is permitted while preventing rotation of the knife blade 122.

As shown in FIGS. 1 and 2, the knife assembly 50 is mounted on the bracket 56 which is spaced from the bracket 52 above the axis B—B of the tire 12 and at the opposite side of the centerplane A—A of the tire 12 from the knife assembly 46. The knife assembly 50 has the same adjustments as the knife assembly 46 so that the blade 122' is movable into engagement with the tread surface 130 to cut a groove 156 having sides 158 at a predetermined angle X to the tread surface which preferably is 90 degrees or perpendicular to the tread surface, illustrated by line Y—Y in FIG. 2. The knife blade 122 is also movable into engagement with the tread surface 130 to cut the groove 128 having sides at a predetermined angle V to the tread surface which preferably is 90 degrees or perpendicular to the tread surface illustrated by line Z—Z in FIG. 2. This is important because the tread surface 130 is curved in a radial plane such as plane C—C shown in FIG. 1.

The center knife assembly 48 shown in FIGS. 1 and 2 does not have the angular adjustments of the side knife assemblies 46 and 50 but does have the other parts which are indicated by the same numerals as those given the parts for the knife assembly 46 but with a double prime mark added. As shown in FIGS. 1 and 2, the knife blade 122" is movable into engagement with the tread surface 130 to a depth determined by the position of the roller 131" to cut a groove 160 at the centerplane A—A of the tire 12.

In operation of the tire tread grooving apparatus 10, the frame 28 and plate 44 are moved from a tread grooving position 162, shown in full lines in FIG. 1, to a retracted position 164 shown in dot-dash lines by rotating the screw 36 through actuation of the motor 38. In the retracted position 164, an operator has access to the adjustments for positioning the knife assemblies 46 and 50 and setting the positions of the rollers 131, 131' and 131". The tire 12 may then be rolled up the ramp 22 and mounted on the chuck members 16 supported by the shaft 18. The shaft 18 may then be lifted to raise the tire 12 away from ramp 22 and the tire inflated to a suitable pressure such as 40 psi (2.8123 kg/cm$^2$). The cylinders 100, 100' and 60 which may be double acting and connected to a source of hydraulic fluid pressure are actuated to retract the knife holders 104, 104' and 104" from the position shown in FIG. 1.

The screw 36 is then rotated by the motor 38 to move the frame 28 and plate 44 from the retracted position 164 to the tread grooving position 162 with the knife blades 122, 122' and 122", which may be in the heated condition, close to the tread surface 130. The tread grooving position 162 is different for different diameter tires and may be set by the control switch 42 connected to a microswitch 166 adjustably mounted on a rod 168 on the base 34. A microswitch 170 may also be mounted on the base 34 for engagement with the frame 28 at the retracted position 164 and is connected to the control switch 42 for stopping the rotation of the screw 36 when the frame is returned to the retracted position from the tread grooving position 162.

With the frame 28 in the tread grooving position 162 the tire 12 may be rotated by rotating the shaft 18 and the chuck members 16 at a suitable speed such as five revolutions per minute. Hydraulic fluid is then communicated to the cylinders 60, 100 and 100' for simultaneous movement of the knife holders 104, 104' and 104" toward the tire 12 causing the heated knife blades 122, 122' and 122" to move into simultaneous engagement with the tread surface 130 at circumferentially and axially spaced locations 172, 173 and 176. In this way the cutting of the grooves 128, 156 and 160 is started at the same time even though the locations 172, 174 and 176 are spaced circumferentially of the tire 12. It is understood that with the apparatus of this embodiment, controls may be set up to retract the knife blades 122, 122' and 122" to provide grooves of different desired lengths. With an aircraft tire 12, as shown in the drawings, it is preferred that the grooves 128, 156 and 160 be circumferentially continuous and extend over 360 degrees. It can also be seen that additional knife assemblies may be added and mounted on the plate 44 to cut additional grooves in the tread surface 130. By spacing the knife assemblies 46, 48 and 50 for engagement with the tread surface 130 at circumferentially spaced locations 166, 168 and 170, space is provided so that the grooves 128, 156 and 160 may be closely spaced in an axial direction of the tire 12.

When the grooves 128, 156 and 160 have been cut, as for example, after turning the tire 12 through 360 degrees, the cylinders 100, 100' and 60 are actuated to retract the knife holders 104, 104' and 104" disengaging the knife blades 122, 122' and 122" from the tire and moving them away from the tread surface 130. The screw 36 may then be rotated to move the frame 28 and plate 44 from the tread grooving position 162 to the retracted position 164. The tire 12 may then be deflated and removed from the chucks 16 and away from the shaft 18 for lowering onto the ramp 22 and rolling away from the apparatus 10. The apparatus 10 is then ready for another tire of the same diameter. If the tire 12 is of a different diameter, then the knife assemblies 46, 48 and 50 may be adjusted. Also if the depth of the grooves 128, 156 and 160 is to be changed, then the position of the rollers 131, 131' and 131" may be adjusted.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for grooving a tread in a tread surface of a tire mounted on a chuck member rotatably mounted on a tire supporting stand for rotation about an axis coaxial with the axis of the tire comprising a base member, a frame slidably mounted for selective movement on said base member between a retracted position and a grooving position for a tire of a predetermined diameter, knife means including a knife and a bracket mounted on said frame, said knife means being adjustable relative to said frame for positioning said knife to cut a groove having sides at a predetermined angle to said tread surface of the tire in said grooving position of said frame, and said knife means further including a knife assembly having a knife actuating means for moving said knife relative to said chuck member and said frame into and out of cutting engagement with the tread surface for cutting said groove to a predetermined length on said tread surface, and said knife assembly being pivotally supported on a rod for angular adjustment about an axis generally parallel to a centerplane of the tire, said rod being in threaded engagement with a nut, a socket in said bracket for receiving said nut, means for moving said rod relative to said socket by relative turning movement of said rod in said nut, means to lock said nut on said rod to fix the longitudinal position of said rod in said socket, means to change the angular position of said nut in said socket, means to lock said angular position of said nut in said socket to fix the angular position of said rod in said socket and said knife assembly further including a knife holder mounted on said knife actuating means for movement toward and away from said chuck, said knife having a U-shape fastened to said knife holder, and a roller adjustably mounted on said knife holder for rolling engagement with said tread surface to control the depth of the groove cut by said knife.

2. Apparatus for grooving a tread in a curved tread surface in a radial plane of a tire mounted on a chuck member rotatably mounted on a tire supporting stand for rotation about an axis coaxial with the axis of the tire comprising a base member, a frame slidably mounted for selective movement on said base member between a retracted position and a grooving position for a tire of a predetermined diameter, knife means including a knife and a bracket mounted on said frame, adjustment means such that said knife means is adjustable relative to said frame for positioning said knife to cut a groove having sides perpendicular to said curved tread surface of the tire in said grooving position of said frame, and said knife means further including a knife assembly having a knife actuating means for moving said knife relative to said chuck member and said frame into and out of cutting engagement with the tread surface for cutting said groove to a predetermined length on said tread surface, and said knife assembly being pivotally supported on said bracket for angular adjustment about an axis generally parallel to a centerplane of the tire, means for moving said knife assembly longitudinally relative to said bracket, means to fix the longitudinal position of said knife assembly on said bracket, said adjustment means including means to change the angular position of said knife assembly on said bracket and means to fix said angular position of said knife assembly on said bracket to cut a groove having sides perpendicular to said curved tread surface, and said knife assembly further including a knife holder mounted on said knife actuating means for movement toward and away from said chuck, said knife being fastened to said knife holder, and a roller adjustably mounted on said knife holder for rolling engagement with said tread surface to control the depth of the groove cut by said knife.

3. A method for forming grooves in a curved tread surface in a radial plane of a tire mounted for rotation about its own axis on a chuck supported on a tire supporting stand with a first knife of a first knife means mounted on a frame for cutting a first groove and a second knife of a second knife means mounted on said frame for cutting a second groove in said tread surface at a position spaced axially of said tire from said first groove including the steps of:

(a) adjusting the position of said first knife means and said second knife means in a retracted position for engagement of said said first knife and said second knife with said tread surface to cut said grooves with sides perpendicular to said curved tread surface;

(b) moving said frame from said retracted position to a tread grooving position adjacent said tread surface;

(c) rotating said tire in the inflated condition;

(d) extending said knife means to move said knife radially of said tire axis into cutting engagement with said tread surface at a first location with said frame in said grooving position for grooving said first groove in said tire;

(e) extending said second knife into engagement with said tread surface at a second location simultaneously with the movement of said first knife into engagement with said tread surface at said first location, said second location being spaced circumferentially from said first location providing for cutting said first groove and said second groove in said tread surface at axially and circumferentially spaced locations on said tread surface, said first and second knives are moved into cutting engagement with said tread surface in directions perpendicular to said tread surface at said first and second locations on said tire tread to cut grooves and with sides perpendicular to said curved tread surface;

(f) retracting said first knife means and said second knife means to move said first knife and said second knife out of cutting engagement with said tread at said first location and said second location after rotation of said tire a predetermined amount to cut grooves with sides perpendicular to said tread surface; and (g) moving said frame from said tread grooving position to said retracted position.

* * * * *